Sept. 20, 1960  B. C. PHILLIPS  2,953,347
VALVE SEAT FOR FLUID CONTROL VALVE

Filed April 19, 1954  2 Sheets-Sheet 1

INVENTOR
BERNARD C. PHILLIPS
BY
Harry O. Ernsberger
ATTORNEY

INVENTOR
BERNARD C. PHILLIPS
BY
Harry O. Ernsberger
ATTORNEY

United States Patent Office 2,953,347
Patented Sept. 20, 1960

2,953,347

VALVE SEAT FOR FLUID CONTROL VALVE

Bernard C. Phillips, Toledo, Ohio, assignor to The Tillotson Manufacturing Company, Toledo, Ohio, a corporation of Ohio Filed Apr. 19, 1954, Ser. No. 424,028

2 Claims. (Cl. 251—361)

This invention relates to valve seats and more especially to a valve seat arrangement having particular utility in combination with a needle valve of the character employed for fuel flow control in charge-forming devices or carburetors.

It has been conventional practice in carburetor constructions or charge-forming devices for use with internal-combustion engines to control the admission of liquid fuel into a receptacle or bowl of the carburetor by a valve member having a conically shaped portion cooperating with an edge zone of a wall defining a fuel passage or orifice as a valve seat, both the valve and valve seat member being formed of metal such as brass or other suitable metal. The valve member is usually associated with suitable float mechanism or other means for regulating or controlling the relative position of a valve member in relation to the metal valve seat to control fuel flow from a supply into the receptacle in the carburetor as the fuel therein is delivered into the cylinders of an engine together with the requisite amount of air to provide a combustible mixture. It is customary to use a valve seat formed of brass, the cone-shaped valve engaging the annular edge of the orifice or port formed in the valve seat member through which the liquid is admitted into the carburetor receptacle.

After a period of use, the seat becomes worn and the valve does not seat properly so that control of the fuel level in the receptacle is impaired. In many instances the wear of the valve or of the seat after a short period of use of the carburetor causes flooding of fuel in the receptacle, rendering the carburetor unusable for its intended purposes.

The fuel control valve is subject to substantially constant opening and closing actions during the use of the carburetor for delivering combustible mixture to an engine. The continuous opening and closing action causes wear of the valve seat. The high frequency engine vibration also greatly aggravates wear of the valve seat. The edge of the port through which the fuel flows must be a true circle to provide for seating of a metal valve to avoid leakage.

An object of the present invention is the provision of a valve seat construction wherein the valve seat is formed of yieldable or resilient material which, in cooperation with a valve member, provides for an effective closing of the valve port with a minimum of pressure exerted by the valve upon the seat.

An object of the invention is the provision of a valve seat construction for use with a needle valve which is formed of resilient material resistant to the deleterious effects of hydrocarbon fuels and which is readily yieldable to conform to slight irregularities of the needle surface, resulting in improved sealing qualities.

Another object of the invention is the provision of a valve seat construction for use with a fuel flow control valve in carburetors or charge-forming devices wherein the element forming the valve seat in assembly is compressed or stressed to form a seal for the fuel conduit without affecting the seating zone engaged by the valve member.

Another object of the invention is the provision of a valve seat for fuel-regulating valve of the float-controlled type wherein all tendency for the valve to stick or adhere to the valve seat is eliminated.

Another object of the invention is the provision of a valve seat for a fluid flow control valve shaped or configurated to form a seal with a fuel duct or passage when in assembled position and adapted for cooperation with a cone-shaped valve member for effectively and accurately controlling the level of liquid fuel in a fuel-receiving receptacle of a carburetor.

Still another object of the invention is a valve and seat assembly utilized as fuel flow controlling means for a carburetor or charge-forming device wherein the assembly may be easily removed and replaced for cleaning purposes.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

While forms of the invention have been illustrated as embodied in a charge-forming device or carburetor for use in supplying fuel-and-air mixture to an internal-combustion engine, it is to be understood that the fluid flow controlling means of the invention may be utilized in controlling the flow of other fuels and liquids, for example, mechanisms for controlling oil flow for oil burners or for maintaining predetermined levels of liquids in receptacles of various types.

Figure 2:
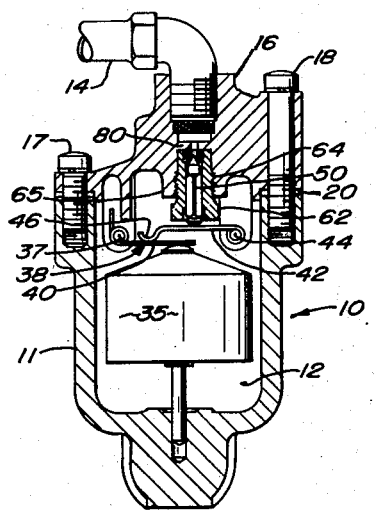
Figure 2 is a vertical sectional view through the carburetor or charge-forming device shown in Figure 1, illustrating a form of valve seat construction of the invention.
Figure 1:
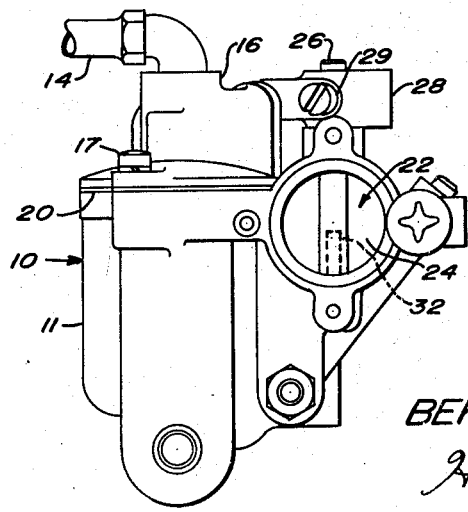
Figure 1 is an elevational view of a carburetor or charge-forming device embodying a form of the present invention.

The illustrated embodiments of the invention are especially adapted for use in a carburetor of the character illustrated in Figures 1 and 2. The carburetor 10 is inclusive of a lower body 11 formed with a receptacle or chamber 12 which is adapted to receive liquid fuel from a supply through a tube 14. The carburetor body 11 supports an upper body or cover portion 16 which forms a closure for the fuel receptacle 12 and which supports the valve and valve seat arrangement of the invention. The members or portion 16 is secured to the lower body portion 11 by means of screws 17 and 18, a sealing gasket 20 being interposed between the member 16 and the body structure 11.

The carburetor body is shaped to provide a mixing passage 22 in which is disposed a disc-type throttle valve 24 for controlling the flow of fuel-and-air mixture to the engine (not shown) with which the carburetor may be connected. The throttle valve 24 is secured upon a shaft 26 which extends exteriorly of the carburetor and is provided with a fitting 28 held to the shaft by means of a securing screw 29, the fitting 28 providing means for adjusting the position of the throttle valve. A main fuel discharge jet or tube 32 is arranged in the mixing passage for discharging fuel into an air stream moving through the passage 22.

Disposed within the fuel receptacle or chamber 12 is a float 35 which is of a construction to be buoyed up by the liquid fuel, the relative vertical position of the float being dependent upon the level of fuel in the receptacle. Pivotally supported upon a pivot pin or shaft 37 is a lever 38 of bellcrank shape. The horizontally disposed arm 40 of the lever is adapted to be engaged by the central zone of the upper portion of the float 35 so that a rise in fuel level in the receptacle 12 elevates the float 35, causing the lever 38 to pivot or swing in a counterclockwise direction as viewed in Figure 2.

A second lever or member 42 is pivotally supported upon a pin or shaft 44 as shown in Figure 2. An end portion 46 of the lever is shaped to curved configuration and engages or contacts the upper surface of the arm 40 of lever member 38. A valve member 50 of the so-called needle type for regulating the flow of fuel from the supply tube 14 into the chamber 12 engages and is supported by the lever member 42, the valve member engaging the lever 42 intermediate its ends. As shown in Figure 2, an upward movement of the float 35, resulting from flow of fuel or liquid into the receptacle 12, causes the lever 38 to swing in a counterclockwise direction around the pivot pin 37. The movement of lever 38 is transferred to lever 42 through engagement of portion 46 thereof with the lever arm 40, causing pivotal movement of lever 42 in a clockwise direction around the supporting shaft or pivot pin 44. This movement actuates the needle valve or valve member 50 toward valve-closing position.

Figure 3:
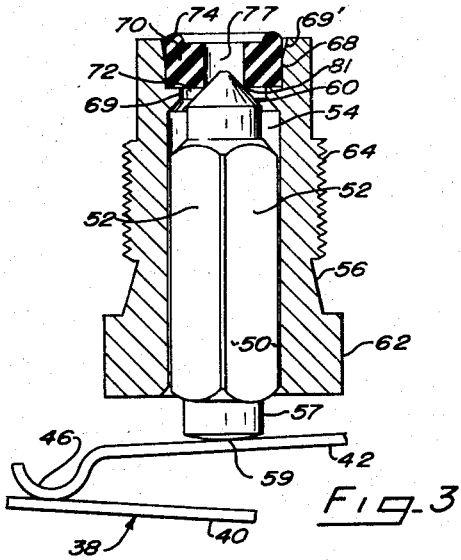
Figure 3 is a greatly enlarged view of a valve casing or guide fitting, valve and valve seat arrangement of the invention.

The valve 50 and valve seat arrangement and assembly are shown greatly enlarged in Figure 3. The needle valve 50 has a body portion formed of polygonal configuration and is preferably of triangular or square shape in cross section providing uniplanar facets or surfaces 52. The valve member 50 is loosely or slidably contained within a cylindrical bore 54 formed in a fitting 56, the spaces between the facets 52 and the wall of bore 54 forming passages for fuel to flow along the body of the valve into the chamber 12. The lower end of the valve member 50 is provided with a tenon 57 having a spherically shaped or curved end zone 59 which engages or rests upon the upper surface of the lever member 42. The upper zone of the valve member is formed with a conically shaped valve portion 60 which is adapted for cooperation with a valve seat structure of the invention for regulating the flow of liquid fuel into the receptacle or chamber 12.

The fitting or valve guide 56 is formed at its lower zone with a portion 62 which is polygonally shaped in cross section to receive a wrench or other tool for assembling or removing the fitting. The fitting is formed with a threaded portion 64 which engages with a threaded portion in a bore formed in boss 65 formed integrally with the portion 16 of the carburetor whereby the fitting may be fixedly assembled with the portion 16.

The fitting 56 is formed at its upper region with a cylindrical bore 68 which terminates in a ledge 69 which forms a positioning or limiting abutment for a valve seat member. Disposed within the cylindrical bore 68 is a valve seat or seat member 70. The valve seat member 70 is made of flexible or yieldable material, for example, one of the synthetic rubbers selected from the group of butadiene acrylonitrile copolymers, (nitrile rubbers), isobutylene-diolefin copolymers (butyl), polychloroprene (neoprene) and butadiene-styrene copolymers. Other yieldable or flexible materials which are not readily subject to deterioration on contact with hydrocarbon fuels may be used in fabricating the valve seat member 70. The lower surface 72 of member 70 engages or seats upon the ledge or abutment 69 to properly locate the seat 70 with respect to the fitting 56.

The valve seat 70 is shaped so that upon assembly in a carburetor or other construction a limited region of the seat structure will be distorted, flexed or compressed to establish a seal between the fitting enclosing the valve structure and the portion of the carburetor structure defining a fuel supply opening or passage. As shown in Figure 3 the upper portion of the valve seat 70 is fashioned or formed with an annular ridge or bead 74, the surface configuration of which is of torus-like shape. The valve seat member 70 is formed with a central passage 77 through which fuel from the fuel supply tube 14 is conveyed to the valve chamber 54 and chamber 12 when the valve 50 is out of engagement with the seat or valve-seating zone of member 70.

Figure 4:
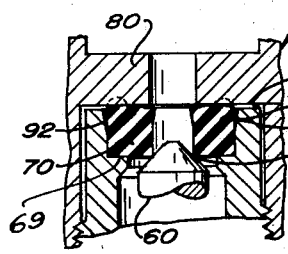
Figure 4 is a fragmentary detail sectional view illustrating the configuration of the valve seat member when assembled in stressed or distorted position of use in a carburetor.

In assembly of the fitting 56 in the carburetor in position shown in Figure 2, the fitting is drawn up or threaded into position engaging the ridge or annular raised portion 74 into contact with a flange portion 80 in the carburetor cover structure 16 and is distorted or flexed as shown in Figure 4, forming a seal with the flange 80. The distortion of the annular ridge 74 results in an expansion and flattening of the ridge 74, flexing the upper peripheral portion of the member 70 into an annular clearance space formed by a frustoconically shaped wall 69' formed on the fitting 56.

The compression or distortion of the annular ridge 74 results in flexure or distortion of the upper surface of member 70 without materially affecting the shape or contour of the annular or circular edge 81 of the member 70 which forms a seat for the cone-shaped portion 60 of the valve 50. By this means a fluid-tight seal is effected between the upper surface of the valve seat member 70 and the flange 80 in the carburetor structure without any distortion of the portion of the seat member engaged by the valve.

Figure 5:
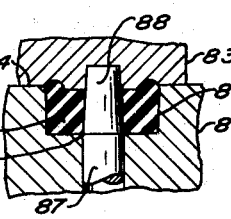
Figure 5 is a sectional view illustrating a method of molding or forming a type of valve seat construction of the invention.

Figure 5 is illustrative of a method of molding or forming a valve seat member structure shown in Figure 3. The molds 82 and 83 for forming a valve seat member 70 are arranged with surfaces in contiguous relation as shown at 84, the zone 84 forming a separation area in order to remove the molded seat member 70 from the molds. The lower mold 82 is shaped to mold the body portion of the valve and the upper mold 83, provided with an angular recess, molds or forms the raised, annular portion or bead 74 on the member 70. The side wall 85, formed in the mold 82, is of slightly frustoconical formation, providing suitable draft sufficient to facilitate withdrawal of the molded member from mold 82. A pin 87 is disposed in the position illustrated in Figure 5 during molding operations and forms a core which, when withdrawn after the completion of a molding operation, provides the opening or passage 77 through the valve seat member 70. The portion 88 of the pin is of slightly tapered or frustoconical formation to facilitate withdrawal of the molded member at the completion of a molding operation.

It should be noted that the molds are parted at the zone or region 84 so that any flash of the material from which the member 70 is formed which may occur during molding will be at the surface 84. This feature is important in that no flash or roughness of the valve seat 81 results from the use of this molding method.

Figure 4 illustrates the distorted or flexed condition of the upper zone of valve 70 when the latter is assembled in the cover 16 of the carburetor. It should be noted that the annular ridge 74 on the valve body is distorted or flexed in a lateral direction whereby circumferential portions 90 of the upper region of member 70 are pushed outwardly or radially and occupy the annular zone 92, provided by the tapered walls 69' on the valve guide or fitting. In the assembly of the fitting and seat member, it is desirable that the upper, end wall 94 of the fitting 56 be slightly spaced from the adjacent portion of the carburetor cover 16 so that the compression of the annular ridge portion 74 of the valve is effective to provide a seal with the carburetor cover 16. The annular space 92 in fitting 56 provides a region spaced from the valve seat 81 so that an accurate seating of the valve 60 may be attained at all times. The clearance or zone 92 also provides for accommodating swell or expansion of the yieldable material or synthetic rubber of which the valve seat member is formed which may be caused by contact with certain types of hydrocarbon fuels.

Figure 6:
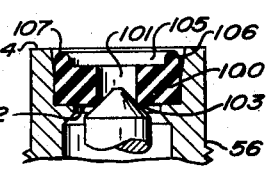
Figure 6 is a fragmentary vertical sectional view showing a modified form of valve seat member.
Figure 7:
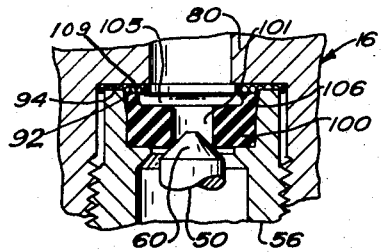
Figure 7 is a fragmentary sectional view illustrating the valve seat member of Figure 6 in assembled position.

Figures 6 and 7 illustrate a modified form of valve seat member embodying the invention. The seat member 100 is formed with a central opening or passage 101 and a lower surface 102, the intersection of which forms an annular seat 103. Member 100 is formed at its upper zone with a cylindrical recess 105 bounded by an upwardly extending, annular wall portion or ridge 106 which has a toroidal-shaped upper surface 107. It will be noticed that in this form of valve seat member the uppermost portion of surface 107 is below the plane of surface 94 of fitting 56. Figure 7 illustrates the configuration of valve member 100 in assembly with the carburetor cover member 16. In the illustrated assembly, a gasket member 109 is interposed between the upper surface 94 of fitting 56 and the seating surface of flange 80 formed in the carburetor cover 16. The gasket 109 may be fashioned of semihard material having a degree of resilience sufficient to establish a seal with the fitting 56 when the latter is assembled in the position shown in Figure 7. Gasket 109 engages the toroidal-shaped surface 107 and compresses, distorts or displaces the annular ridge 106 of member 100. The displaced material may move into clearance zone 92 or into recess 105 defining the annular wall 106. Thus, an effective seal is provided between the annular ridge 106 and lower surface of gasket 109 without distorting or affecting the contour of seat 103 of the member 100.

Figure 8:
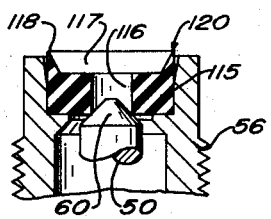
Figure 8 is a sectional view similar to Figure 6 showing another form of valve seat member.
Figure 9:
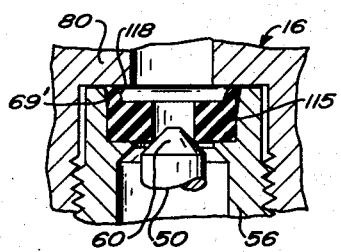
Figure 9 is a sectional view showing one form of mounting or assembly of the valve seat member of Figure 8.
Figure 10:
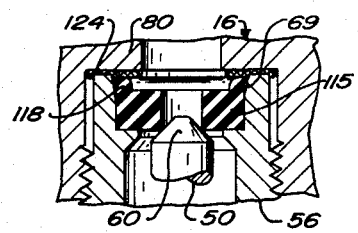
Figure 10 is a sectional view similar to Figure 9 showing a modified form of mounting of the valve seat member.

Figures 8 through 10, inclusive, illustrate a modified form of valve seat construction. In this form the fitting 56 supports a member 115 having a central fuel inlet passage 116. The member 115 is formed with a circular recess 117 bounded by a raised portion 118 at the periphery of the seat member 115. The raised portion 118 is of triangular cross section and terminates at its upper zone in an apex 120 which in plan view is in the form of a circle. The seat member 115, before assembly in a carburetor, is inserted in the fitting 56 and occupies the position shown in Figure 8.

Figure 9 illustrates the construction of Figure 8 when the fitting 56 has been assembled with the carburetor cover member 16. During assembly, the apex 120 of the annular, raised portion or ridge 118 engages the face of ledge 80 of the carburetor cover 16; thus, when the fitting 56 is drawn into final, assembled position, the ridge 118 is distorted in the manner shown in Figure 9 and forms a seal with the carburetor portion 16. The distortion of the ridge 118 does not affect the lower zone of the seat member 115 adjacent the portion thereof forming a seat for the portion 60 of valve member 50. The ridge 118 of the seat member under compression and distortion flows into the annular clearance space provided by the tapered surface 69' formed at the upper zone of the fitting 56.

Figure 10 is illustrative of the seat member 115 when assembled with the carburetor cover or portion 16 with a gasket 124 of medium-soft material disposed between the seat member 115 and the carburetor cover or portion 16. In the form of assembly shown in Figure 10, the ridge 118 is likewise distorted into the clearance space provided by the tapered surface 69 formed on the fitting 56.

Figure 11:
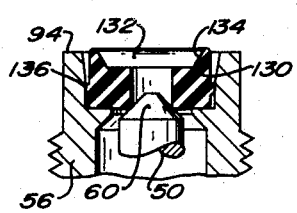
Figure 11 is a fragmentary sectional view of another form of valve seat member.
Figure 12:
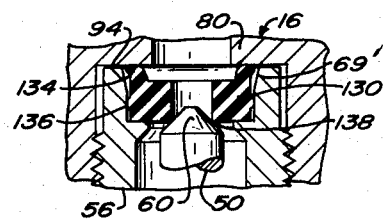
Figure 12 is a view showing the valve seat member of Figure 11 assembled in a carburetor.

Figures 11 and 12 illustrate a further form of the invention. In this form the valve seat member 130 is formed with a central recess 132 bound by an axially arranged, annular ridge or bead 134 of the configuration shown in Figure 11. The upper zone of ridge 134 normally extends above the surface 94 of fitting 56.

In this form the valve seat member 130 is provided with a radially projecting, circular bead, ridge or flange 136 adapted to engage the inner wall of the recess formed in the upper portion of fitting 56 to accommodate the valve seat member. It should be noted that the ridge 136 is the only portion of the valve seat member in contact with the inner, cylindrical wall of the fitting 56.

Figure 12 illustrates the construction of Figure 11 in assembled relation with carburetor cover portion 16. As shown, the fitting 56 is threaded into member 16 until the upper surface 94 of the fitting is adjacent to or in contact with the lower surface of flange 80 on member 16. In this position ridge portion 134 of valve seat member 130 is flexed or distorted in the manner illustrated, forming a seal with the lower surface of flange 80 of the carburetor. The distortion of bead 134 established during assembly of fitting 56 into the position illustrated in Figure 12 results in the yieldable material of the valve seat member flowing into the clearance space provided in the recess in the fitting through the tapered or angular surface 69' formed on fitting 56. The downwardly acting pressure through bead 134 is effective to exert a radial force upon the bead or flange 136, causing the latter to engage snugly the cylindrical wall portion defining the recess in fitting 56 and form a seal therewith. The flexure or distortion of the material of which valve seat member 130 is formed is not transmitted to the valve seat zone 138; hence, there is no distortion of the seating zone. Therefore, the cone-shaped valve portion 60 of valve member 50 will seat properly in the seating zone 138 of the valve seat member 130. Through the arrangement shown in Figures 11 and 12, a seal is concomitantly established between the ridge or bead 134 and flange 80 of the carburetor cover or portion 16 and between ridge 136 and the interior wall of the recess of the fitting 56. A gasket of the character shown at 124 in Figure 10 may be used with the valve seat member 130.

Figure 13:
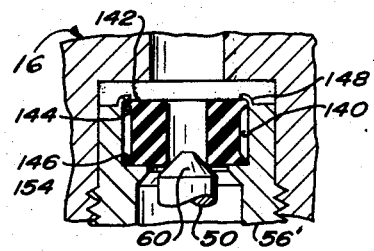
Figure 13 is a sectional view illustrating a further modification of valve seat member and mounting therefor.

Figure 13 is illustrative of a modification of the invention wherein a valve seat member is permanently assembled with a valve guide fitting or casing. In this form of construction, the fitting 56' is formed with a cylindrical recess 140, within which is positioned a valve seat member 142 whose periphery, at its upper and lower zones, is formed with radially extending beads, ridges or flanges 144 and 146. The fitting 56' is formed with an axially extending, thin-walled projection or sleeve 148 which may be spun or otherwise formed into the position illustrated in Figure 13 to retain valve seat member 142 in recess 140 of the fitting. The operation of spinning wall 148 into engagement with the upper zone of seat member 142 exerts downwardly and radially directed pressures upon beads or ridges 144 and 146, whereby the ridges snugly engage the wall of recess 140 to form a seal with fitting 56'. In assembling this arrangement, a gasket (not shown) is inserted between cover portion 16 of the carburetor and a ledge on the lower end of the fitting 56' to establish a seal. The spinning of the thin-walled portion 148 into engagement with seat member 142 does not affect the seating line or seating zone 154 of the valve seat member.

It will be apparent that in all forms of the invention disclosed an effective seat is established between the valve seat member, the fitting supporting the same and carburetor portion 16 without distortion of the seating zone of the valve member. The use of flexible or yieldable material for the seat member provides a degree of resiliency to accommodate the valve portion 60 and center the latter in proper closed position and minimizes tendency for the valve to adhere or stick to the seat.

It is apparent that, within the scope of the invention, modifications and different arrangements may be made other than is herein disclosed, and the present disclosure is illustrative merely, the invention comprehending all variations thereof.

I claim:

1. A fuel flow control means comprising a body member with a fluid passage therein, a tubular fitting extending into said fluid passage, a fuel control valve slidably disposed in the interior of the fitting, said fitting having a circular recess formed at the inner end thereof, an annular seat member of resilient material disposed in the recess, the annular configuration of the seat member aligned with said passage, said fuel control valve having a conically-shaped valve portion, the edge of said passage wall of the annular member at the inner end of said recess forming a seat for the conically-shaped portion of the valve, the apex of said conically-shaped portion extending into the passage defined by the annular seat member, said seat member having an annular raised portion formed on an end opposite the edge zone engaged by the valve, said annular raised portion adapted to be compressed between the fitting and the body member and distorted outwardly for establishing a seal at the zone of the raised portion, the outer wall portion of the circular recess in the fitting having a frusto-conical configuration to form a clearance space which accommodates outward distortion of the compressed seat member.

2. A fuel flow control means as in claim 1, said annular seat member having an outer peripheral annular flange on the side wall thereof in contact with the wall of said circular recess.

References Cited in the file of this patent

UNITED STATES PATENTS

| | | |
|---|---|---|
| 461,440 | King | Oct. 20, 1891 |
| 613,024 | Byrne | Oct. 25, 1898 |
| 1,722,037 | Corser | July 23, 1929 |
| 1,789,964 | Buehrer | Jan. 27, 1931 |
| 2,092,946 | Wolfard | Sept. 14, 1937 |
| 2,299,073 | Beasley | Oct. 20, 1942 |
| 2,344,657 | Thiel | Mar. 21, 1944 |
| 2,481,460 | Williams | Sept. 6, 1949 |
| 2,520,092 | Fredrickson | Aug. 22, 1950 |
| 2,525,799 | Hecker | Oct. 17, 1950 |
| 2,654,560 | Smith | Oct. 6, 1953 |
| 2,662,348 | Jacobsson | Dec. 15, 1953 |

FOREIGN PATENTS

| | | |
|---|---|---|
| 378,947 | France | Aug. 26, 1907 |
| 302,834 | Great Britain | Dec. 27, 1928 |